(12) United States Patent
Kim

(10) Patent No.: US 7,483,210 B2
(45) Date of Patent: Jan. 27, 2009

(54) ZOOM LENS OPTICAL SYSTEM

(75) Inventor: Yong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 11/403,882

(22) Filed: Apr. 14, 2006

(65) Prior Publication Data

US 2006/0279852 A1    Dec. 14, 2006

(30) Foreign Application Priority Data

Jun. 10, 2005 (KR) .................. 10-2005-0049653

(51) Int. Cl.
G02B 27/64 (2006.01)

(52) U.S. Cl. .................. 359/554; 359/557; 396/55; 348/208.11

(58) Field of Classification Search .................. 359/554, 359/557; 396/55; 348/208.11
See application file for complete search history.

(56) References Cited

U.S. PATENT DOCUMENTS 5,719,703 A * 2/1998 Sato ........................... 359/557

FOREIGN PATENT DOCUMENTS

| JP | 09-218346 | 8/1997 |
| JP | 11-052242 | 2/1999 |
| JP | 11-237551 | 8/1999 |
| JP | 11-344669 | 12/1999 |
| JP | 2001-116996 | 4/2001 |
| JP | 2002-244037 | 8/2002 |
| JP | 2003-140048 | 5/2003 |
| JP | 2004-061605 | 2/2004 |

OTHER PUBLICATIONS

Office Action issued on Jun. 8, 2007 by the Chinese Intellectual Property Office for Chinese Patent Application No. 200610093592.1.
Office Action issued Aug. 22, 2006 by the Korean Intellectual Property Office re: Korean Patent Application No. 2005-49653 (3 pp).

* cited by examiner

*Primary Examiner*—Joseph Martinez
(74) *Attorney, Agent, or Firm*—Stein, McEwen & Bui, LLP

(57) ABSTRACT

A zoom lens optical system having a third lens unit including a first correction lens unit of negative (−) power and a second correcting lens unit arranged behind the first correcting lens unit in an optical path and having positive (+) power. The system can minimize aberration variation upon hand-shaking correction and obtain high resolution upon OIS application since the third lens unit for correcting the hand-shaking is formed with a lens group of plural lenses having negative (−) power and positive (+) power. Further, the system can enhance a response speed since the minimization of aberration variation upon the hand-shaking correction can reduce driving load when lenses move due to short movement distance of the third lens unit.

11 Claims, 5 Drawing Sheets

OIS CORRECTION BY ONE LENS

OIS CORRECTION BY FOUR LENSES

ZOOM LENS OPTICAL SYSTEM

CROSS-REFERENCE TO RELATED APPLICATIONS

This application claims the benefit of Korean Patent Application No. 2005-49653, filed Jun. 10, 2005, in the Korean Intellectual Property Office, the disclosure of which is incorporated herein by reference.

BACKGROUND OF THE INVENTION

1. Field of the Invention

Aspects of the present invention relate to a zoom lens optical system, and more particularly, to a zoom lens optical system having a hand-shaking correcting function.

2. Description of the Related Art

Generally, zoom lenses provided in still cameras or video cameras are required to be compact, while having superior optical performance, a large aperture, and a high zoom ratio. These zoom lenses are installed in such a way so that plural lens units simultaneously move for focal control along a predetermined axis. Of course, there are many different ways to design zoom lenses, and any number or type of lens units may be used.

A user captures images of an object while holding a still camera or a video camera, but hand-shaking inevitably occurs even though the user tries to keep the camera steady while taking the pictures. Recently, technology has been developed which enables a camera to automatically correct the hand shaking of its user. In particular, since cameras are becoming more compact and lightweight, the hand shaking problem is becoming more serious than ever. Furthermore, a camera user today frequently takes pictures while moving, and therefore has trouble keeping the camera steady. Thus, solving the problem of hand shaking has become an important consideration for attempting to achieve clear images.

A known principle of hand-shaking correction is to detect an amount of movement of a focused image caused by hand shaking, and then shift the image backwards by the detected movement amount, so that the image seems to stand still. Such hand-trembling corrections can be categorized into two categories: electronic hand-shaking correction, and optical hand-shaking correction.

Electronic hand-shaking correction is implemented in a charged-coupled device, or "CCD," drive control mode, or implemented in a field memory vibration control mode. Optical hand-shaking correction is implemented in a mode using a variable vertical angle prism or in a mode using movement of some lenses.

However, electronic hand-shaking correction has the drawback of image degradation of 20-30% because not all the CCD pixels are used in the correction process. Therefore, it is preferable to use optical hand-shaking correction because it results in no image degradation.

FIG. 1 is a view for schematically showing a zoom lens optical system enabling optical hand-shaking correction. FIG. 1 shows a 3-CCD zoom lens optical system comprising a first lens unit 10, a second lens unit 20, a third lens unit 30, a fourth lens unit 40, an OLPF (Optical Low Pass Filter) 50, a prism assembly 60, and a CCD assembly 70.

The first lens unit 10 contains two convex lenses and one concave lens, and has positive (+) power in order for incident light to converge at a certain angle.

The second lens unit 20 is installed to move along an optical axis L to change a size of an image incident along the optical axis L of the first lens unit 10. The second lens unit 20 contains one convex lens and two concave lenses, and has positive (+) power.

The third lens unit 30 has one convex lens, transferring the image changed by the second lens unit 20 to the fourth lens unit 40.

The fourth lens unit 40 contains one convex lens and one concave lens and has positive (+) power, correcting the image passed through the third lens unit 30. The fourth lens unit 40 moves along the optical axis L, and performs image point movement corrections according to zooming operations and focusing operations based on changes in the distance between the fourth lens unit 40 and the object.

The OLPF 50 filters a wavelength of incident light in order for the wavelength to be below a certain bandwidth, so that light passed through the above lens units 10, 20, 30, and 40 and focused on the CCD assembly 70 does not form hot pixels.

The prism assembly 60 decomposes the filtered light by color, and transfers the decomposed color lights to the CCDs of the CCD assembly 70.

The CCD assembly 70 is formed in a 3-CCD mode having one CCD for each of the colors R, G, and B in order to enable the light decomposed by color through the prism assembly 60 to be focused as an image by color.

The third lens unit 30 moves up and down the optical axis L in order to correct the hand-shaking caused by a user. Specifically, if an image captured when the camera is still is focused at a position A and an image captured when the camera is shaken is focused at a position B, the third lens unit 30 moves itself in the direction perpendicular to the optical axis L to a distance substantially equal to the distance between the positions A and B in order for the focusing position to become the position A again.

However, if the third lens unit 30 is formed with only one lens as above, one problem is that that a big aberration variation occurs upon hand-shaking correction. Furthermore, there are limitations to the acquisition of high resolution when chromatic aberration correction and Optical Image Stabilizer (OIS) are applied.

SUMMARY OF THE INVENTION

Aspects of the present invention have been developed in order to solve the above and/or other drawbacks and other problems associated with the conventional arrangement. One aspect of the present invention is to provide a zoom lens optical system capable of minimizing aberration variation upon hand-shaking correction and obtaining high resolution upon chromatic aberration correction and OIS application.

Additional aspects and/or advantages of the invention will be set forth in part in the description which follows and, in part, will be obvious from the description, or may be learned by practice of the invention.

The foregoing and other aspects and advantages are substantially realized by providing a zoom lens optical system having a first lens unit positioned on an optical axis and which converges incident light of an incident image, a second lens unit positioned on the optical axis and which changes a size of the incident image, a third lens unit having a first lens correction unit of negative power and a second lens correction unit of positive power and which transfers the incident image changed by the second lens unit to a fourth lens unit, and a fourth lens unit positioned on the optical axis which focuses the incident image passed through the third lens unit.

Preferably, the first correction lens unit has two lenses spaced apart from each other by a certain focal length, 3. The system may be as claimed in claim 1, wherein the second correction lens unit contains two lenses bonded to each other.

Further, the second correction lens unit vertically moves up and down over the optical axis.

Preferably, the system satisfies a condition |ff/fr|<1.9 when a focal length of the first correction lens unit is denoted as ff (G7, G8) and a focal length of the second correction lens unit as fr (G9, G10).

The system satisfies conditions bflw/fw>3.7 and bflt/ft>0.2 when a focal length of a wide-angle end is denoted as fw, a focal length of a telephoto end as ft, a back focal length of a wide-angle end as bflw, and a back focal length of a telephoto end as bflt, and 8. The system as claimed in claim 1, satisfying a condition 0<fm/fam<0.2 when a focal length of a wide-angle end is denoted as fw, a focal length of a telephoto end as ft, a total focal length of the wide-angle end as fmw, and a total focal length of the telephoto end as fmt wherein the total focal length is a distance from the first lens unit to the third lens unit and fm=$\sqrt{fw \times ft}$, and fam=$\sqrt{fmw \times fmt}$.

As mentioned above, the present invention can prevent image degradation which occurs as a result of electronic hand-shaking correction, using the optical hand-shaking correction.

Further, the present invention can reduce the load on the third lens unit by minimizing a movement distance of the third lens unit for the hand-shaking correction, since the third lens unit is formed with a first correcting lens unit of negative power and a second correcting lens unit of positive power.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
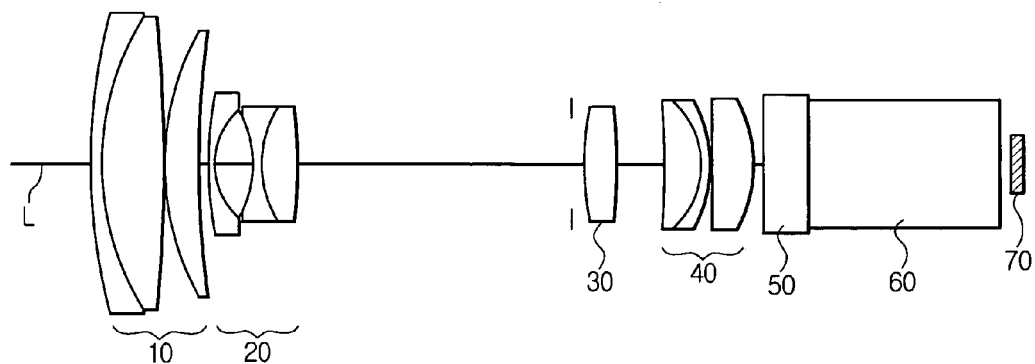
FIG. 1 is a view for schematically showing a conventional 3-CCD zoom lens optical system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
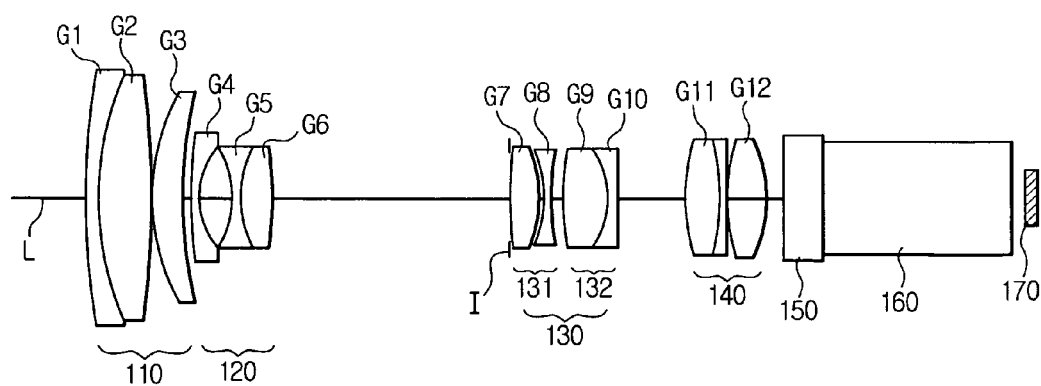
FIG. 2 is a view for schematically showing a 3-CCD zoom lens optical system according to an embodiment of the present invention.

As shown in FIG. 2, a zoom lens optical system according to an embodiment of the present invention comprises a first lens unit 110, a second lens unit 120, a third lens unit 130, a fourth lens unit 140, an optical low pass filter (OLPF) 150, a prism assembly 160, and a CCD assembly 170.

The first lens unit 110 contains two convex lenses G2 and G3 and one concave lens G1, and has positive (+) power in order for incident light to converge at a certain angle.

The second lens unit 120 is disposed coaxially with the first lens unit 110 and moves along an optical axis L of the first lens unit 110 in order to change a size of an image. The second lens unit 120 contains one convex lens G6 and two concave lenses G4 and G5 and has positive (+) power.

Figure 3A:
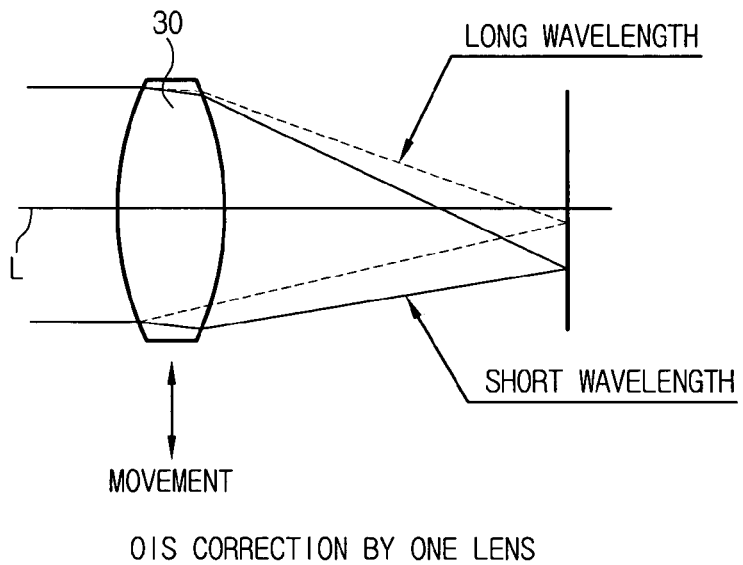
FIGS. 3A and 3B are views for showing correction operations of the third lens unit of FIGS. 1 and 2, respectively.
Figure 3B:
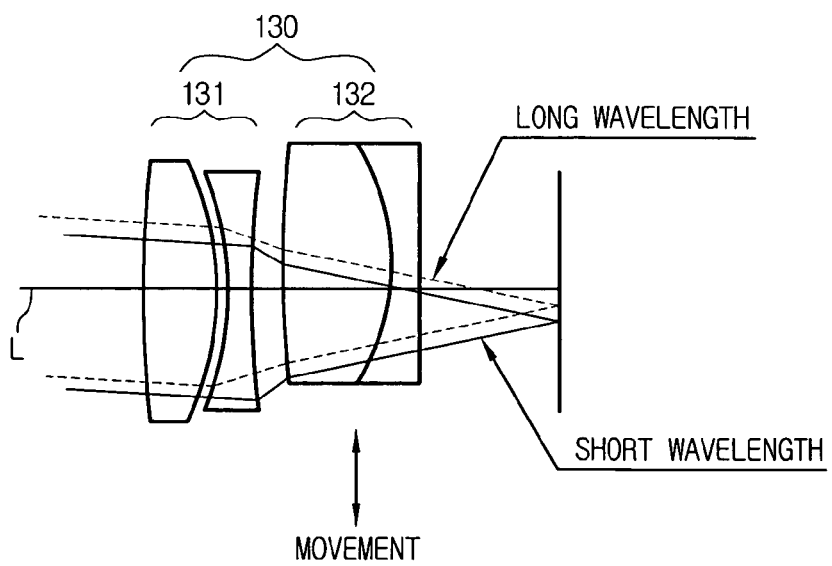

The third lens unit 130 is arranged along the optical axis L of the second lens unit 120, has an iris I in front, and transfers the image changed by the second lens unit 120 to the fourth lens unit 140. The third lens unit 130 has a first correcting lens unit 131 of negative (−) power and a second correcting lens unit 132 of positive (+) power arranged behind the first correcting lens unit 131 along an optical path. In here, the second correcting lens unit 132 is installed to move up and down, as shown in FIG. 3B, in order to correct image jitter caused by hand-shaking. It is preferable to design the lenses of the second correcting lens unit 132 with a small diameter so that the second correction lens unit 132 has less of a load on it while moving.

A combination of plural lenses is required for chromatic aberration correction. According to an embodiment of the present invention, the first correction lens unit 131 of negative (−) power is formed with a total of two lenses, i.e., a convex lens G7 and a concave lens G8, and the second correction lens unit 132 of positive (+) power is formed with two bonded lenses in total, i.e., a convex lens G9 and a concave lens G10. Of course, the number of lenses is not limited to the four lenses used in this particular embodiment. Other numbers of lenses can be used as well.

A description will now be made of the optical characteristics of the first and second correction lens units 131 and 132;

When a focal length of the first correction lens unit 131 is denoted as ff (G7, G8) and a focal length of the second correction lens unit 132 is denoted as fr (G9, G10), the condition of |ff/fr|<1.9 is satisfied.

Table 1 shows lens data of the third lens unit 130 according to an embodiment of the present invention. The columns of numerical values in Table 1 are arranged from left to right in the order of a surface, a surface curvature radius, a center distance D to a next surface, and a refractive index of a medium located on the right side of the surface, and dispersion. A remarks column is also included.

TABLE 1

| SURF NO | RADIUS | Distance (mm) | Refractive index | Dispersion | Remarks |
|---|---|---|---|---|---|
| 1 | 50.01 | 0.65 | 1.846 | 23.9 | |
| 2 | 18.62 | 3.1 | 1.603 | 60.7 | |
| 3 | −57.89 | 0.15 | | | |
| 4 | 13.57 | 1.8 | 1.772 | 49.6 | |
| 5 | 28.51 | 0.5 | | | |
| 6 | 40.90 | 0.4 | 1.883 | 40.9 | |
| 7 | 4.53 | 1.98 | | | |
| 8 | −6.43 | 0.5 | 1.665 | 55.2 | aspheric |
| 9 | 6.16 | 1.8 | 1.846 | 23.9 | |
| 10 | −28.50 | 13.85 | | | |
| 11 | stop | 0.1 | | | |
| 12 | 35.34 | 1.65 | 1.606 | 27.4 | aspheric |
| 13 | −7.09 | 0.27 | | | aspheric |
| 14 | −6.8 | 0.55 | 1.696 | 55.6 | |
| 15 | 20.29 | 0.7 | | | |
| 16 | 22.58 | 2.5 | 1.690 | 48.4 | |
| 17 | −5.16 | 0.6 | 1.563 | 45.1 | |
| 18 | infinite | 4.02 | | | |
| 19 | 12.21 | 1.95 | 1.487 | 70.4 | |
| 20 | −16.41 | 0.45 | 1.846 | 23.9 | |
| 21 | 66.79 | 0.12 | | | |

TABLE 1-continued

| SURF NO | RADIUS | Distance (mm) | Refractive index | Dispersion | Remarks |
|---|---|---|---|---|---|
| 22 | 13.75 | 2.2 | 1.514 | 63.1 | aspheric |
| 23 | −8.58 | 1.0 | | | aspheric |
| 24 | infinite | 2.3 | 1.516 | 64.1 | |
| 25 | infinite | 11 | 1.589 | 61.2 | |
| 26 | infinite | | | | |

TABLE 2

| | Distance 5 (mm) | Distance 10 (mm) | Distance 18 (mm) |
|---|---|---|---|
| Wide (55 deg) | 0.5 | 13.86 | 4.02 |
| Middle (24.2 deg) | 6.99 | 7.36 | 2.71 |
| Tele (5.9 deg) | 13.61 | 0.74 | 3.94 |

[Equation 1]

Aspheric surface expression $$Xa = CY^2/(1+(1-(K+1)C^2Y^2)^{1/2}) + AY^4 + BY^6 + CY^8 + DY^{10}$$

Surf. 8 aspheric surface coefficient
K: −2.060369
A:−0.987313E-03  B:0.298559E-05  C:−0.470051E-05
D:0.108446E-06
Surf. 12 aspheric surface coefficient
K:0
A:−0.928830E-04 B: 0.195716E-04 C:0, D:0
Surf. 13 aspheric surface coefficient
K:0
A:0.199317E-03 B:0.249446E-04 C:0 D:0
Surf. 22 aspheric surface coefficient
K:0
A:−0.195462E-03 B:−0.146425E-04 C:0 D:0
Surf. 23 aspheric surface coefficient
K:0
A:0.450217E-03 B:−0.138232E-04 C:0 D:0

As shown in FIG. 3B, the second correction lens unit 132 provided in the third lens unit 130 formed as above moves up and down in the direction perpendicular to the optical axis L by the dynamic power of a certain actuator and performs the hand-shaking correction.

The fourth lens unit 140 has one convex lens G12 and one concave lens G11 which correct the image passed through the third lens unit 130. The fourth lens unit 140 has positive (+) power. The fourth lens unit 140 moves along the optical axis L, and performs image point movement correction according to zooming operations along with focusing operations according to changes in distance between the fourth lens unit 140 and an object.

The OLPF 150 filters a wavelength of incident light in order for the wavelength to be below a certain bandwidth so that the light passed through the lens units 110, 120, 130, and 140 and focused on the CCD assembly 170 does not form hot pixels.

The prism assembly 160 decomposes the filtered light by color, and transfers the decomposed color lights to the CCD assembly 170.

The CCD assembly 170 is formed in a 3-CCD mode having one CCD for each of the colors R, G, and B in order to enable each decomposed color light passed through the prism assembly 160 to be focused as an image by color.

The zoom lens optical system formed according to this aspect of the invention satisfies the conditions of bflw/fw>3.7 and bflt/ft>0.2 when a focal length of a wide-angle end is denoted as fw, a focal length of a telephoto end is denoted as ft, a back focal length of the wide-angle end is denoted as bflw, and a back focal length of the telephoto end is denoted as bflt. The zoom lens optical system according to this aspect of the invention also satisfies the condition of 0<fm/fam<0.2 when the total focal length is a length from the first lens unit to the third lens unit, a total focal length of the wide-angle end is denoted as fmw, a total focal length of the telephoto end is denoted as fmt, and the relationship between fm, fw, and ft, along with the relationship between fam, fmw, and fmt is defined as:

$$Ifm = \sqrt{fw \times ft}, \text{ and } fam = \sqrt{fmw \times fmt}$$

Hereinafter, a description will be made of the operation of the zoom lens optical system according to this aspect of the present invention, with reference to the accompanying drawings.

When a user uses a camcorder or a still camera provided with the zoom lens optical system according to this aspect of the present invention, image jitter caused by hand shaking frequently occurs. In order to automatically correct such a change of the image, a certain control unit measures an amount of movement, caused by hand-shaking, of the image formed on the CCD assembly 170, and moves the focusing position up and down by the measured movement amount. Such a correction operation is performed through the up and down movement of the second correction lens unit 132 of two bonded lenses of positive (+) power, as shown in FIG. 3B, wherein the second correction lens unit 132 is provided in the third lens unit 130.

If the third lens unit 130 is divided into a first correcting lens unit 131 of negative (−) power, and a second correcting lens unit 132 of positive (+) power, and hand-shaking is corrected, the movement of the lenses in the third lens unit 130 is minimized upon hand-shaking correction, so aberration variation can be minimized.

Figure 4A:
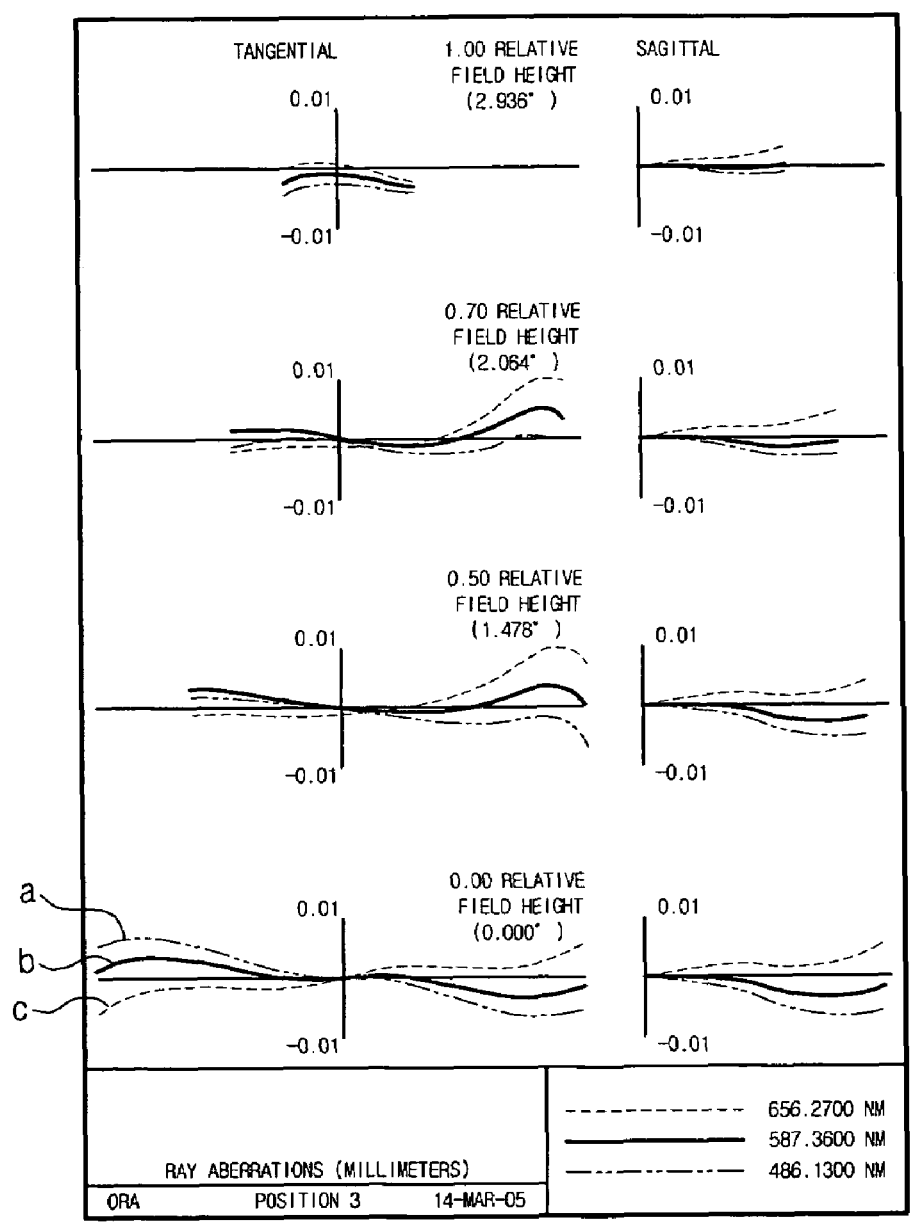
FIGS. 4A and 4B are graphs for showing spherical aberrations in the meridian line before and after hand-shaking correction of the 3-CCD zoom lens optical system according to an embodiment of the present invention, respectively.

FIG. 4A is a graph which shows the spherical aberration of a steady state of no hand-shaking in the meridian line. More specifically, FIG. 4A shows spherical aberration a of light having a wavelength of 0.486 μm, spherical aberration b of light having a wavelength of 0.5876 μm, and spherical aberration c of light having a wavelength of 0.6563 μm in a spherical segment line on the 0.0 top surface, 0.5 top surface, 0.7 top surface, and 1.0 top surface.

Figure 4B:
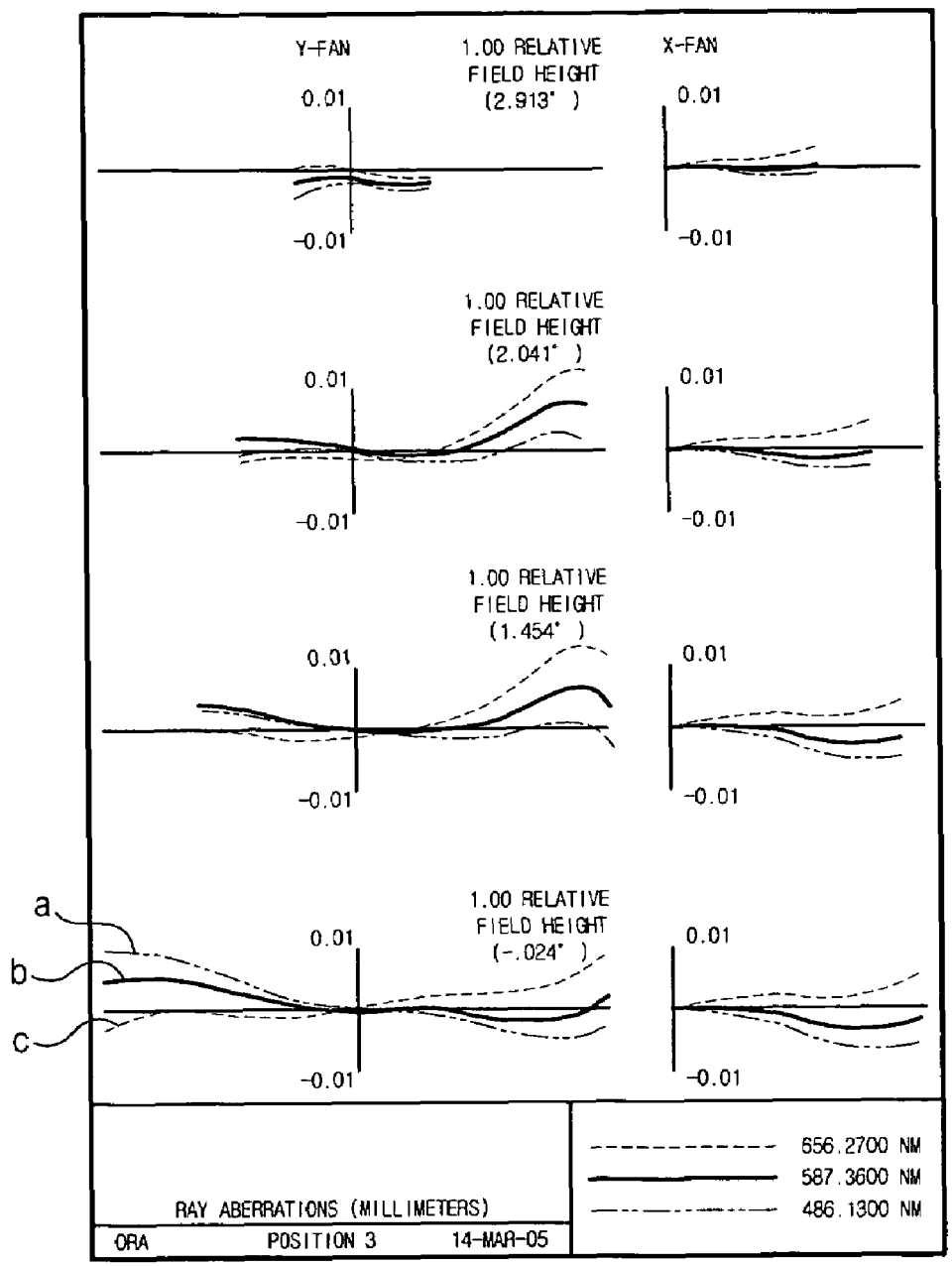

FIG. 4B is a graph for showing spherical aberration of each wavelength after hand-shaking correction by vertical up-and-down movements of the second correction lens unit 132 of the third lens unit 130 over the optical axis L. As shown in the graphs of FIGS. 4A and 4B, the spherical aberration in the meridian line has little or no difference before and after the hand-shaking correction, which indicates that an image is formed in a state similar to the fixed state by the hand-shaking correction operation of the present invention. In other words, this embodiment of the present invention achieves an image captured after hand-shaking substantially similar to an image captured before handshaking.

Figure 5A:
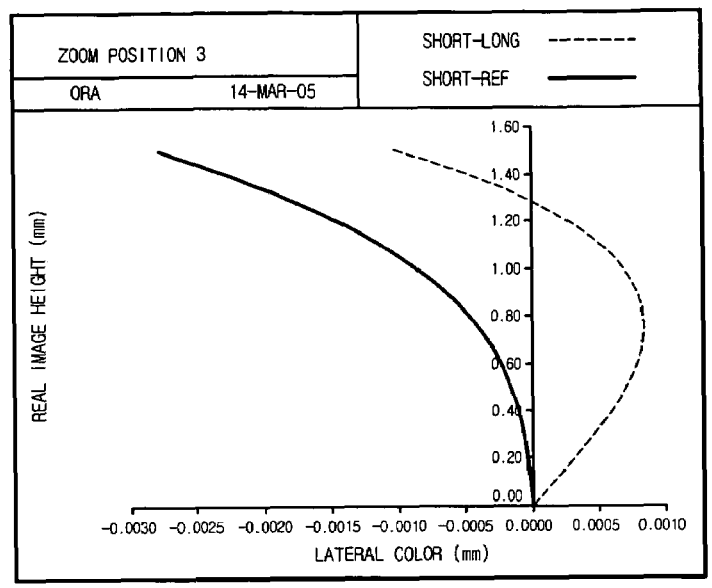
FIGS. 5A and 5B are graphs for showing aberration characteristics based on color distributions before and after the hand-shaking correction of the 3-CCD zoom lens optical system according to an embodiment of the present invention, respectively.
Figure 5B:
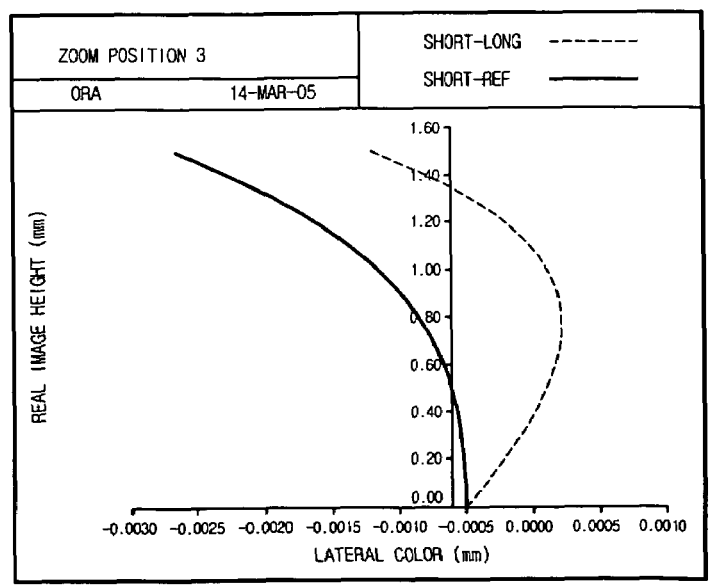

Further, FIG. 5A shows aberration characteristics depending on color distributions in a steady state of no hand-shaking, and FIG. 5B is a graph for showing aberration characteristics depending on color distributions after the hand-shaking correction by vertical movements of the second correction lens unit 132 of the third lens unit 130 over the optical axis L. As shown in FIGS. 5A and 5B, numerical values and shapes experience little or no difference, which indicates that aberration characteristics depending on the image formed on the CCD assembly 170 are constantly maintained. Therefore, the hand-shaking phenomenon caused by a user is properly corrected by the present invention.

The aspects of the present invention as described above can minimize aberration variation upon hand-shaking correction and obtain high resolution upon OIS application, since the third lens unit for correcting the hand-shaking is formed with a lens group of plural lenses having negative (−) power and positive (+) power.

Further, the present invention can enhance response speed since the minimization of aberration variation upon hand-shaking correction can reduce driving load when lenses move due to short movement distance of the third lens unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A zoom lens optical system, comprising:
a lens system having lenses positioned on an optical axis which converges incident light of an incident image, changes a size of the incident image, and focuses the incident image, and
a lens unit positioned on the optical axis which corrects image jitter caused by shaking of the zoom lens optical system, the lens unit further comprising a first lens correction unit of negative power and a second lens correction unit of positive power, and the incident image is incident on the first lens correction unit prior to being incident on the second lens correction unit, and
wherein a focal length of the first correction lens unit is denoted as ff, a focal length of the second correction lens unit is denoted as fr, and the first and second correction lens units are arranged in a configuration which satisfies a condition $|ff/fr|<1.9$.

2. The system of claim 1, wherein the first correction lens unit comprises two lenses spaced apart from each other.

3. The system of claim 2, wherein the second correction lens unit comprises two lenses bonded to each other.

4. The system of claim 1, wherein the second correction lens unit comprises two lenses bonded to each other.

5. The system of claim 1, wherein the second correction lens unit moves in a direction perpendicular to the optical axis substantially a same distance as a measured movement distance of the incident image.

6. A zoom lens optical system, comprising:
a lens system having lenses positioned on an optical axis which converges incident light of an incident image, changes a size of the incident image, and focuses the incident image;
a lens unit positioned on the optical axis which corrects image jitter caused by shaking of the zoom lens optical system, the lens unit further comprising a first lens correction unit of negative power and a second lens correction unit of positive power and the incident image is incident on the first lens correction unit prior to being incident on the second lens correction unit;
a wide-angle end with a focal length denoted as fw and a back focal length denoted as bflw; and
a telephoto end with a focal length denoted as ft and a back focal length denoted as bflt, wherein the system is arranged in a configuration which satisfies the conditions $bflw/fw>3.7$ and $bflt/ft>0.2$.

7. A zoom lens optical system, comprising:
a lens system having lenses positioned on an optical axis which converges incident light of an incident image, changes a size of the incident image, and focuses the incident image;
a lens unit positioned on the optical axis which corrects image utter caused by shaking of the zoom lens optical system, the lens unit further comprising a first lens correction unit of negative power and a second lens correction unit of positive power and the incident image is incident on the first lens correction unit prior to being incident on the second lens correction unit;
a wide-angle end with a focal length denoted as fw and a total focal length denoted as fmw; and
a telephoto end with a focal length denoted as ft and a total focal length denoted as fmt, wherein the total focal lengths fmw and fmt represent the distance from the first lens unit to the third lens unit and the system is arranged in a configuration which satisfies the conditions $fr=\sqrt{fw \times ft}$, and $fam=\sqrt{fmw \times fmt}$.

8. The system of claim 7, wherein the first correction lens unit comprises two lenses spaced apart from each other.

9. The system of claim 8, wherein the second correction lens unit comprises two lenses bonded to each other.

10. The system of claim 7, wherein the second correction lens unit comprises two lenses bonded to each other.

11. The system of claim 7, wherein the second correction lens unit moves in a direction perpendicular to the optical axis substantially a same distance as a measured movement distance of the incident image.

* * * * *

UNITED STATES PATENT AND TRADEMARK OFFICE
CERTIFICATE OF CORRECTION

| | |
|---|---|
| PATENT NO. | : 7,483,210 B2 |
| APPLICATION NO. | : 11/403882 |
| DATED | : January 27, 2009 |
| INVENTOR(S) | : Yong-wook Kim |

It is certified that error appears in the above-identified patent and that said Letters Patent is hereby corrected as shown below:

Column 8, line 25, change "utter" to --jitter--.

Column 8, line 37, change "fr=" to --fm=--.

Signed and Sealed this

Tenth Day of March, 2009

JOHN DOLL
*Acting Director of the United States Patent and Trademark Office*